US012555141B2

(12) United States Patent
Jones et al.

(10) Patent No.: US 12,555,141 B2
(45) Date of Patent: Feb. 17, 2026

(54) OPTIMIZING MEDIA REQUESTS WITH ENSEMBLE LEARNING

(71) Applicant: Zeta Global Corp., New York, NY (US)

(72) Inventors: Zachary Jones, Atlanta, GA (US); Shubhranshu Barnwal, San Francisco, CA (US); Ivan Povalyaev, Prague (CZ); Danny Portman, Atlanta, GA (US); Matus Chladek, New York, NY (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 18/393,379

(22) Filed: Dec. 21, 2023

(65) Prior Publication Data

US 2024/0212001 A1 Jun. 27, 2024

Related U.S. Application Data

(60) Provisional application No. 63/434,931, filed on Dec. 22, 2022.

(51) Int. Cl.
*G06Q 30/02* (2023.01)
*G06Q 30/0273* (2023.01)

(52) U.S. Cl.
CPC .............................. *G06Q 30/0275* (2013.01)

(58) Field of Classification Search
CPC ........... G06Q 30/0248; G06Q 30/0185; G06Q 50/184; G06F 16/951; G06F 16/53; G06F 16/55; G06F 16/9535; G06F 16/958; G06F 40/221; G06V 30/10; G06V 10/764; G06V 30/41
See application file for complete search history.

(56) References Cited

U.S. PATENT DOCUMENTS

2019/0080363 A1* 3/2019 Acuna Agost ........... G06N 7/01
2019/0303980 A1* 10/2019 Yan .................... G06Q 30/0275

OTHER PUBLICATIONS

University of Chicago, "Bayesian Ensemble Learning" Robert McCulloch, NIPS'06: Proceedings of the 19th International Conference on Neural Information Processing Systems (Year: 2006).*
Approaches to Machine Learning, P. Langley at Carnegie-Mellon University (Year: 1984).*

* cited by examiner

*Primary Examiner* — Breffni Baggot
(74) *Attorney, Agent, or Firm* — Schwegman Lundberg & Woessner, P.A.

(57) ABSTRACT

The subject technology optimizes media requests to improve the efficiency and reduce the costs of online media campaigns. The request optimization system may implement one or more ensemble learning techniques that leverage multiple machine learning systems trained on different datasets. The request optimization system may use the ensemble learning techniques to generate optimized media requests that account for one or more campaign goals and minimize price inefficiencies incurred while purchasing placements in online media exchanges. In various embodiments, dynamic data including real time exchange and impression data may be collected and used to retrain one or more machine learning systems. Retaining the machine learning systems on dynamic data may improve the performance of optimized media requests determined by the retrained systems.

18 Claims, 10 Drawing Sheets

OPTIMIZING MEDIA REQUESTS WITH ENSEMBLE LEARNING

PRIORITY CLAIM

This patent application claims the benefit of priority, under 35 U.S.C. Section 119(e), to Jones et al, U.S. Provisional Patent Application Ser. No. 63/434,931, entitled "MACHINE LEARNING SYSTEMS FOR INTELLIGENT PROCESSING OF MEDIA REQUEST METADATA," filed on Dec. 22, 2022, which is hereby incorporated by reference in its entirety.

TECHNICAL FIELD

The subject matter disclosed herein generally relates to the technical field of machine learning used in a network-based computing environment. In particular, the disclosure recites improved media publishing technology that leverages ensemble learning to optimize media requests.

BACKGROUND

The present subject matter seeks to address technical problems existing in configuring digital media campaigns such as, for example, optimizing media request metadata used in an online ad exchange to procure placements for delivering media to a target audience. The technology described herein may improve the performance of online publishing systems by optimizing the handling of media requests by modifying one or more pieces of request metadata, dynamically in real-time as media requests are submitted to an online ad exchange. The one or more pieces of metadata may be modified using a machine learning system that implements one or more ensemble learning approaches. The machine learning system include a new training architecture that improves the predictive power of machine learning systems by using one or more features generated by a first machine learning system to train one or more subsequent machine learning systems to solve regression problems.

BRIEF DESCRIPTION OF THE DRAWINGS

Some embodiments are illustrated by way of example and not limitation in the figures of the accompanying drawings.

DETAILED DESCRIPTION

Figure 1:
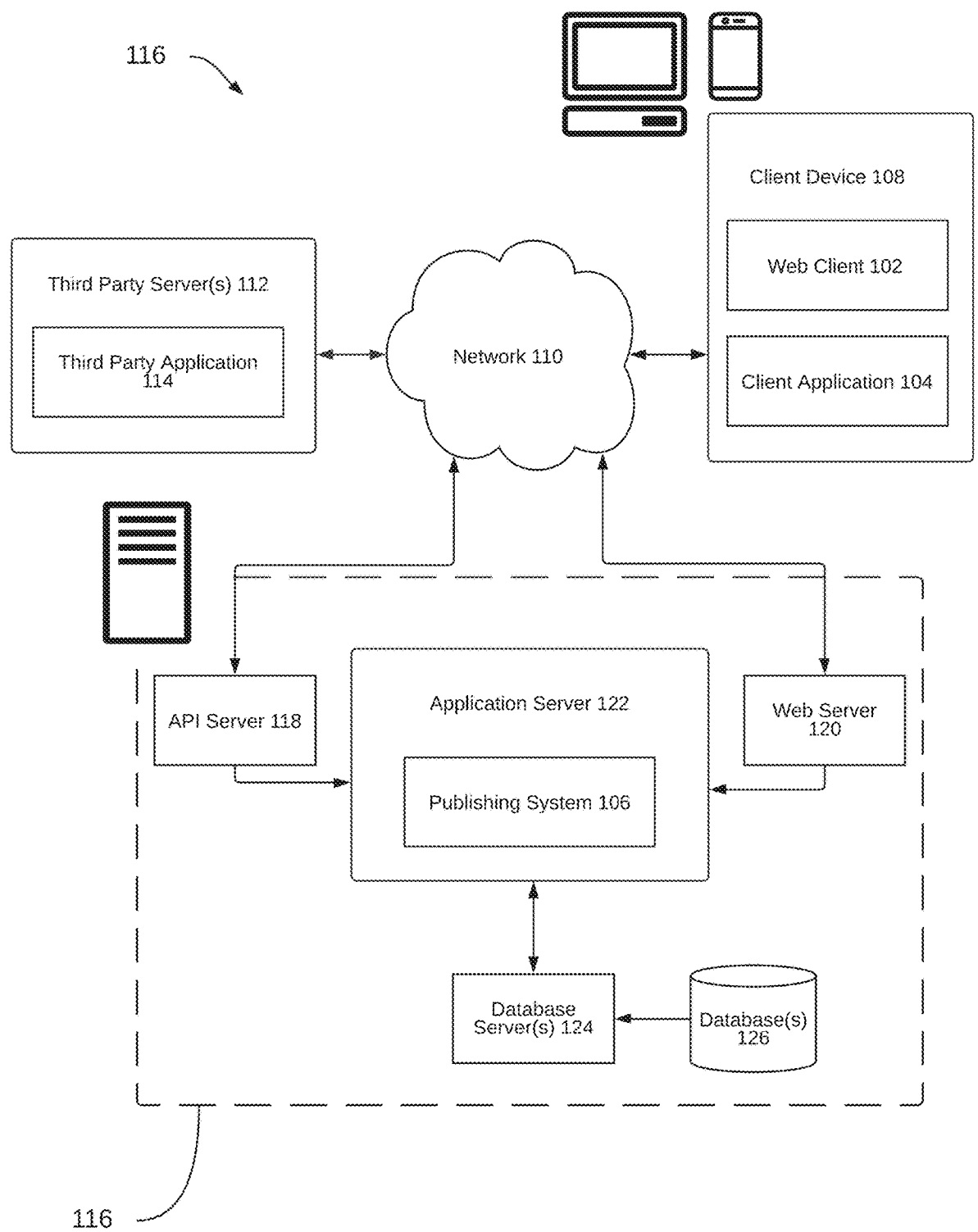
FIG. 1 is a block diagram illustrating a high-level network architecture, according to various embodiments described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In online publishing, users of a demand side platform (DSP) or other publishing software systems distribute media (e.g., text, image data, video content, audio content, streaming content, extended reality (XR) content including virtual reality (VR) content, augmented reality (AR) content, mixed reality (MR) content and any other form of XR content, and the like) over the Internet or other computer network. DSPs enable users to instantly buy placements for media on popular web pages and other high traffic online locations to support scalable media publishing campaigns. In various embodiments, DSPs may run media campaigns, for example, display advertising campaigns that publish digital media and other ad content to a targeted audience. The DSP may run media campaigns programmatically by bidding on available placements for media included in inventory that are auctioned off in real time on an online exchange. For example, a placement may be a portion of a webpage, a portion of a mobile app display, a segment of streaming video or audio, and the like. The DSPs may interface with multiple online exchanges to simultaneously run thousands of media campaigns to enable scalable content publishing capable of reaching millions of users in seconds. For each campaign, the DSPs may bid on placements, resolve successful bids, publish media to the procured placements, and process payment in a fraction of a second (e.g., less than 0.1 s, less than 0.01 s, less than 0.001 s, and the like) before a web page, streaming video file, streaming audio file, or other online location including one or more placements loads on a user device.

Previously, online exchanges running real-time auctions for placements have conducted second price auctions in which the winning bidder pays the second-place price for each placement. Many exchanges are now switching to first price auctions in which the winner pays their original bid. The first price auctions allow the exchanges to collect more revenue but make publishers purchasing placements liable to overpay for their placements. Second price auctions guarantee a market price for each placement but lower the cost of the placement to the cost of the second highest bid. A market price is not guaranteed in first price auctions because the winning bidder is free to pay as much as they want for a placement regardless of what other purchasers (i.e., the market) perceive to be the cost of the placement. For example, suppose advertiser A submits a bid of $0.25 and advertiser B submits a bid of $0.10. Advertiser A wins the auction but overpays by $0.15 relative to a second price auction and $0.14 above the optimal winning bid in a first price auction.

The media request optimization system described herein optimizes requests for media placements in online media campaigns. The request optimization system uses ensemble learning to predict an optimal set of metadata for each media request based on one or more user selected goals for a media campaign. The predicted request metadata may include placement channel, auction type, placement price, and the like. The media request optimization system may dynamically adjust one or more pieces of request metadata based on the performance of previously submitted media requests. For example, the media request optimization system may dynamically reduce a placement price of a media request having a first price auction type in response to a performance metric (e.g., a procurement rate of more than 80%) measured for media requests that were previously submitted to second price auctions.

The media request optimization system may determine the placement price for a media request using one or more ensemble learning systems that generate multiple predicted placement prices for each media request. A first machine learning system may determine an initial placement price for each media request that reflects the raw value of the placement to a publisher based on an amount of lift (e.g., increase in engagement, revenue, or other user selected performance metric) predicted to be achieved by publishing content at that placement. The raw value reflected in the initial placement price is based on the probability campaign content will resonate will the user viewing the placement independent of other factors that may influence the actual price of the placement such as market conditions (e.g., demand by other publishers for the placement) and campaign settings (e.g., selected channels, budget parameters, performance goals, and the like). A second machine learning system may determine an optimized placement price that reduces the initial placement price by a predicted overpay amount determined based on patterns in exchange data observed for a sample of previously submitted media requests, one or more campaign settings, and one or more goal probabilities that predict a likelihood a campaign will achieving one or more user selected campaigns goals. The sample of previously submitted media requests may include one or more media requests having the initial placement price predicted by the first machine learning system that were submitted to an online exchange and used in completed auctions. The goal probabilities may be determined dynamically by the second machine learning system as the campaign runs. The updated goal probabilities may incorporate the performance of previously submitted media requests in in-progress campaigns.

The optimized price predicted by the second machine learning system may reflect a true value of a placement. The true value embodied in the optimized price modifies the raw value based on additional factors that may influence the actual price of a placement (e.g., market conditions and campaign settings). The second machine learning system may determine the optimized price based on patterns learned from the real time exchange data (e.g., auction price histories of similar media request) and real time campaign data (e.g., goal probabilities determined from similar completed campaigns and updated goal probabilities for in-progress campaigns).

The optimized placement price may be applied by to incoming media requests with low latency so that the publishing system can optimize the final placement prices in each of the media requests based on the optimized price predictions. The price adjustments are made in real time to programmatically adjust the publisher's placement prices downward just before media requests are submitted to online exchanges to reduce publishing costs for media campaigns without limiting campaign performance. The media request optimization system may optimize media spend at scale by reducing the costs for each placement.

The ensemble learning techniques implemented by the media request optimization system increase the accuracy of the placement prices predicted for media requests. Stacking multiple machine learning systems within an integrated prediction pipeline allows multiple factors beyond audience target parameters and engagement probabilities to be considered when predicting optimal placement prices. The ensemble learning techniques also support training on real time data including, for example, real time market conditions and updated goal probabilities, so that the media request optimization system may predict the cost of placements in in first price auctions with more certainty. The media request optimization system may modify the mix of publishing channel (e.g., web, mobile, streaming video, streaming audio, linear tv, and the like) and auction types based on the optimized placement prices to ensure campaigns do not run over budget. For example, the media request optimization system may route more media requests to channels that run second price auctions if the predicted optimized placement prices for channels having first price auctions exceeds a price threshold. The media request optimization system may also route more media requests to first price auctions channels (that deliver more predicted life relative to second price channels) based on predicted optimized placement prices that are below a price threshold.

The media request optimization system may use audience targeting parameters to determine the most valuable placements to procure using each media request. The value of each placement reflected in the optimized placement price is determined based on a likelihood a user viewing a webpage of other online media publication will engage with the media content published in the placement. The media request optimization system determines a higher optimized placement prices for placements that will be displayed to online users that are more likely to be interested in the media content included in the media request. Accordingly, the media request optimization system may also improve the functionality of websites, mobile applications, streaming services, and other networked systems that display media by ensuring the media content displayed by the systems at each placement is engaging for the audience of users viewing media content on each system.

With reference to FIG. 1, an example embodiment of a high-level SaaS network architecture 100 is shown. A networked system 116 provides server-side functionality via a network 110 (e.g., the Internet or WAN) to a client device 108. A web client 102 and a programmatic client, in the example form of a client application 104, are hosted and execute on the client device 108. The networked system 116 includes an application server 122, which in turn hosts a publishing system 106 (such as a DSP) that provides a number of functions and services to the client application 104 that accesses the networked system 116. The client application 104 also provides a number of interfaces described herein (e.g., campaign setup user interfaces for selecting campaign settings, campaign monitoring user interfaces for tracking campaign performance, and the like), which can present outputs to a user of the client device 108 and receive inputs thereto in accordance with the methods described herein.

The client device 108 enables a user to access and interact with the networked system 116 and, ultimately, the publishing system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publishing system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publishing system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website or streaming platform hosted by a third party.

Turning now specifically to the applications hosted by the client device 108, the web client 102 may access the various systems (e.g., the publishing system 106) via the web interface supported by the web server 120. Similarly, the client application 104 (e.g., a digital marketing "app") accesses the various services and functions provided by the publishing system 106 via the programmatic interface provided by the API server 118. The client application 104 may be, for example, an "app" executing on the client device 108, such as an iOS or Android OS application, to enable a user to access and input data on the networked system 116 in an offline manner and to perform batch-mode communications between the client application 104 and the networked system 116. The client application 104 may also be a web application or other software application executing on the client device 108.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publishing system 106 could also be implemented as a standalone software program, which does not necessarily have networking capabilities.

Figure 2:
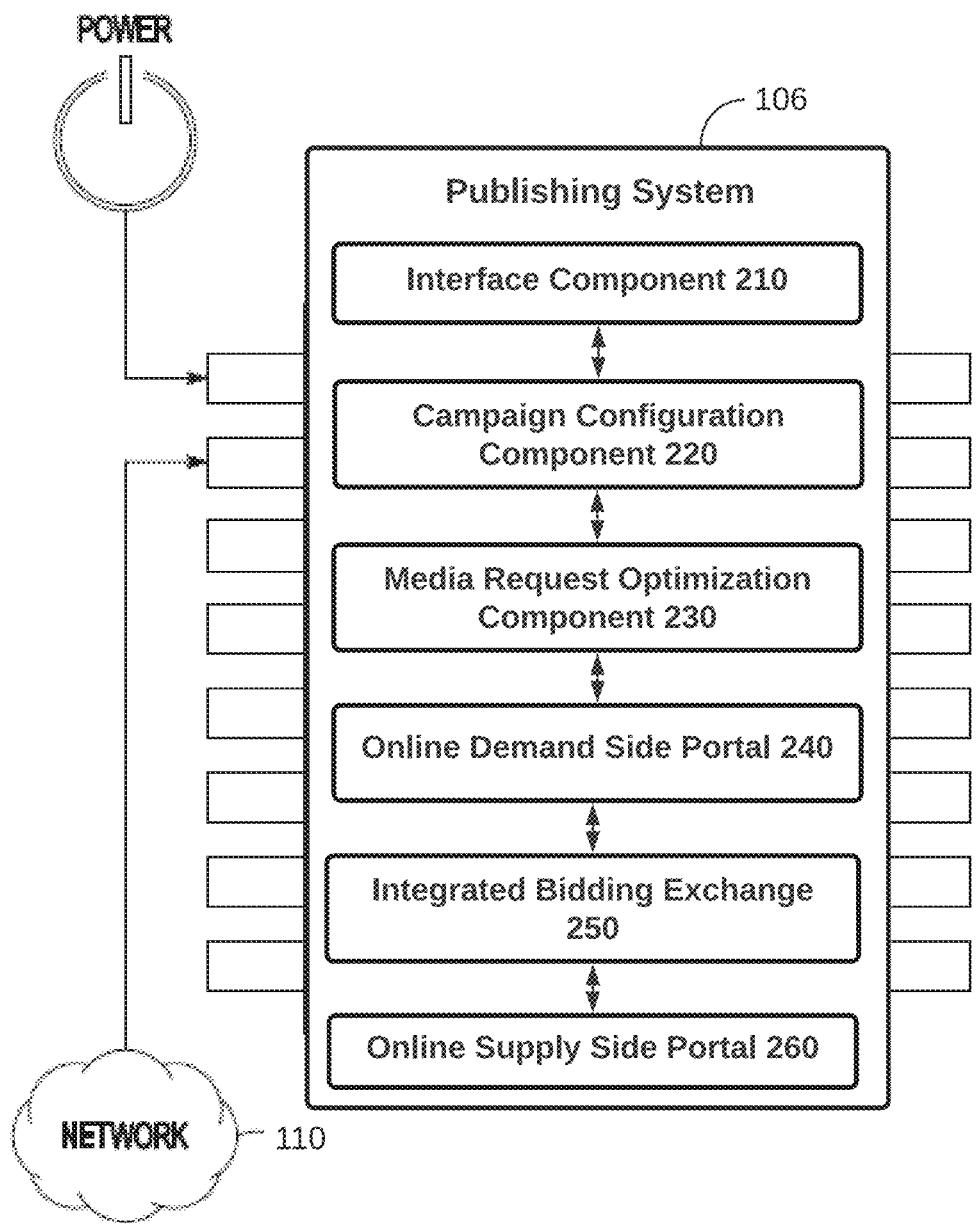
FIG. 2 is a block diagram showing architectural aspects of a publishing system, according to various embodiments described herein.

FIG. 2 is a block diagram showing architectural details of a publishing system 106, according to some example embodiments. Specifically, the publishing system 106 is shown to include an interface component 210 by which the publishing system 106 communicates (e.g., over a network 110) with other systems within the SaaS network architecture 100.

The interface component 210 is collectively coupled to one or more campaign configuration components 220 that operate to provide specific aspects of configuring and optimizing media campaigns deployed on the publishing system 106, in accordance with the methods described further below with reference to the accompanying drawings. The campaign configuration components 220 are coupled to a media request optimization component 230 that reviews media requests and campaign settings of each media campaign and predicts an optimal set of request metadata for each media request.

The publishing system 106 includes an integrated bidding exchange 250, an online demand side portal 240 accessible to a targeted content provider, and an online supply side portal 260 accessible to a publisher of content on the publication network 110. The bidding exchange 250 is communicatively coupled to the demand side portal 240 and the supply side portal 260 to present user interfaces enabling receipt of media requests from a brand or other media provider for placement of media by a publisher at a specified location or domain in available inventory on the publication network 110. In some examples, the publishing system 106 may be configured to present the targeted media to a consumer at the specified location or domain on the publication network. For example, the demand side portal 240 may be configured to reserve, upon resolving of a successful media request from the media provider, the specified location or domain for placement of media. The demand side portal 240 may then publish the piece of media included in the campaign at the reserved placements. Accordingly, users accessing the locations including the reserved placements may view and engage with the media. A user may include a user as described above, for example an online consumer seeking actionable media on the publication network 110. In some examples, the publishing system 106 is further configured to process a transaction between the media provider and the publisher based on the presentation or a viewing of the targeted media by the consumer, or a third party.

In various embodiments, the media request optimization component 230 may optimize media requests submitted to the integrated bidding exchange 250 by the demand side portal 240. The media request optimization component 230 may predict a price of each placement requested by the demand side portal 240 for each campaign. The media request optimization component 230 may modify one or more pieces of metadata included in media requests generated by the demand side portal 240 by, for example, adjusting a placement price, auction type, and/or channel based on a predicted set of optimal request metadata. The modified media requests may then be submitted to the integrated bidding exchange 250.

It should be understood that the publishing system 106 may include one or more instances of each of the components. For example, the publishing system 106 may include multiple instances of the demand side portal 240 and multiple instances of the supply side portal 260 with each instance being operated by a different targeted media provider and different media publisher respectively. It should also be understood that the process for bidding for placement of media at a specified location or domain and the process for providing the targeted media for display may be partially or completely programmatic. For example, a demand side API or other logic included in the online demand side portal 240 may programmatically bid on media placements, resolve successful bids to reserve placements, and publish media at the reserved placements programmatically in a faction of a second to support multiple, simultaneous high volume media campaigns.

In various embodiments, the demand side portal 240 may be configured based on one or more campaign settings of the media campaign. For example, the demand side portal 240 may be programmed to target placements that satisfy budgeting and/or targeting parameters included in the campaign settings. The campaign configuration component 220 may also track campaign performance in real time by recording the number of displays, views, impressions, clicks, conversions, responses, and other interactions with the published media as impression data. The campaign configuration component 220 may then dynamically update the media requests generated by the demand side portal 240 in response to the impression data in order to achieve one or more user selected goals for the media campaign. For example, placement prices in media requests and/or a number of media requests submitted by the demand side portal 240 may be increased to boost the number of views or clicks observed for a campaign media. The campaign configuration component 220 may also update the targeting parameters of the campaign settings in response to impression data to increase the probability of achieving one or more user selected goals. For example, particular demographic constraints (e.g., target females ages 25-35) may be added to the targeting parameters in response to observing a high number of impressions from a particular demographic in the impression data. The updated targeting parameters may configure the demand side portal 240 to submit media requests that reserve more placements at locations having traffic that contains a significant number of users within a particular high performing demographic.

In various embodiments, the publishing system 106 may use impression data to enrich a consumer identity profile stored in a data cloud or other database. For example, the publishing system 106 may collect impression data capturing engagement of consumers with the targeted media. The impression data may include metadata used to identify the users interacting with the targeted media. For example, the identification metadata may include one or more unique identifiers (e.g., email address, IP address, device identifier, and the like) associated with a consumer. The publishing system 106 may resolve an identity and geographic location for the consumers based on the one or more datasets stored in the data cloud. In various embodiments, the identity and geographic location for the consumers may be resolved by matching one or more pieces of identification metadata with known identifiers for the consumers included in a consumer attributes profile stored in an identity graph, data cloud, or other database. The consumer attributes profile may include location data (e.g., a zip code, street address, or other known geographic location for the consumer) and one or more intender attributes. The intender attributes may include individual metrics that may be used to determine an intent of a consumer to purchase a product, visit a store, view an ad, or perform another action. For example, the intender attributes may include demographic information and other consumer data as well as individual level brand propensities (e.g., a tendency of the consumer to shop at store of a particular brand, purchase a particular brand of athletic shoes or other goods, consume content on YouTube or another particular media publisher by a particular band, and the like), brand affinity scores (e.g., metrics that describe how frequently and/or consistently consumers engage with particular brands, for example, how often consumers purchase products made by the brand, click or view ads or emails sent by the brand, visit a particular brand website, and the like), product propensities (e.g., the types of products or services consumers frequently and/or consistently buy or show interest in), and the like. The intender attributes may also include semantic codes (e.g., key words or important terms) summarizing the content of web pages and other digital media browsed by consumers. The intender attributes may also include an attitude or behavioral propensity (e.g., materialistic, athletic, health conscious, frugal, aggressive, or other personality trait) or a channel propensity (e.g., email, web page display, mobile ad, connected tv media, or other marketing channel preferred by a consumer).

The intender attributes and the geographic locations for the consumers may be extracted from the attribute profiles and provided to the campaign configuration component 220. In various embodiments, the campaign configuration component 220 may include a geographic insights generator that may identify the geographic location for each of the consumers and group the consumers by geographic location. The geographic insights generator may then determine geo-specific intender attributes for consumers located within one or more pre-selected locations. To target specific consumers and/or geographic regions, one or more geo-specific intender attributes and/or a city, zip code, or other location may be input into the campaign configuration component 220 as targeting parameters.

To run online media campaigns, intender attributes that identify particular brands, products, types of content, and marketing channels that resonate most with a particular segment of consumers (e.g., consumers within a particular age range or other demographic, consumers located in a particular geographic area, and the like) may be displayed to users of the publishing system 106 within the campaign configuration component 220 and added as targeting parameters. The campaign configuration component 220 may use the demand side portal 240 to access bidstream data provided by one or more online publishers. The bidstream data may include information about the placements included in inventory available on the bid exchange 250. For example, the bidstream data may include, for example, media format, device type, location data, and one or more cookies or other user ids. The campaign configuration component 220 may match one or more user ids included in the bidstream data to one or more user ids included in the consumer identity profiles to determine more information about each user that may view a particular placement. The campaign configuration component 220 may configure the demand side portal 240 to generate media requests that target placements displayed to users having one or more attributes (e.g., intender attributes, geo-specific intender attributes, and the like) included in the targeting parameters for a campaign. The demand side portal 240 may access the integrated bid exchange 250 to submit media requests and/or update one or more previously submitted media requests based on the targeting parameters provided by the campaign configuration component 220. In various embodiments, the campaign configuration component 220 may also dynamically update the media requests generated by the demand side portal 240 based on the impression data observed for placements that were procured by previously submitted media requests and one or more user selected goals for the campaign. For example, the campaign configuration component 220 may modify media requests to target placements viewed by different audiences and/or placements in different channels in response to impression data that indicates the campaign is performing is worse for the user's selected goal (e.g., viewability rate) relative to other KPIs measured from impression data (e.g., conversion rate, click-through rate, etc.). For example, if impression data indicates the campaign has a high click-through rate relative to the campaign's viewability rate, the campaign configuration component 220 may remove one or more of the targeting parameters to configure the demand side portal 240 to submit media requests for a larger volume of less targeted placements in order to maximize the viewability rate for the campaign.

Figure 3:
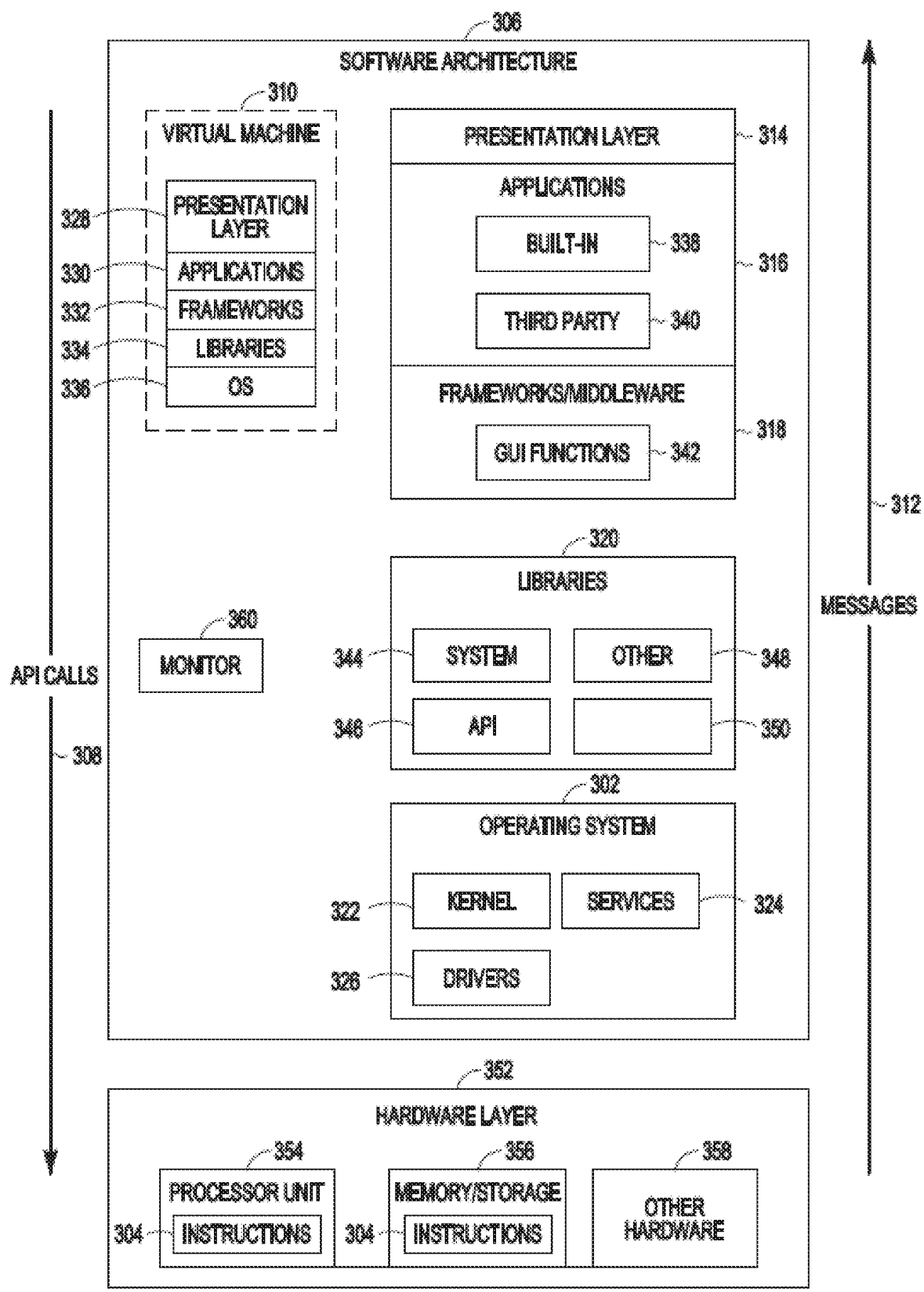
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
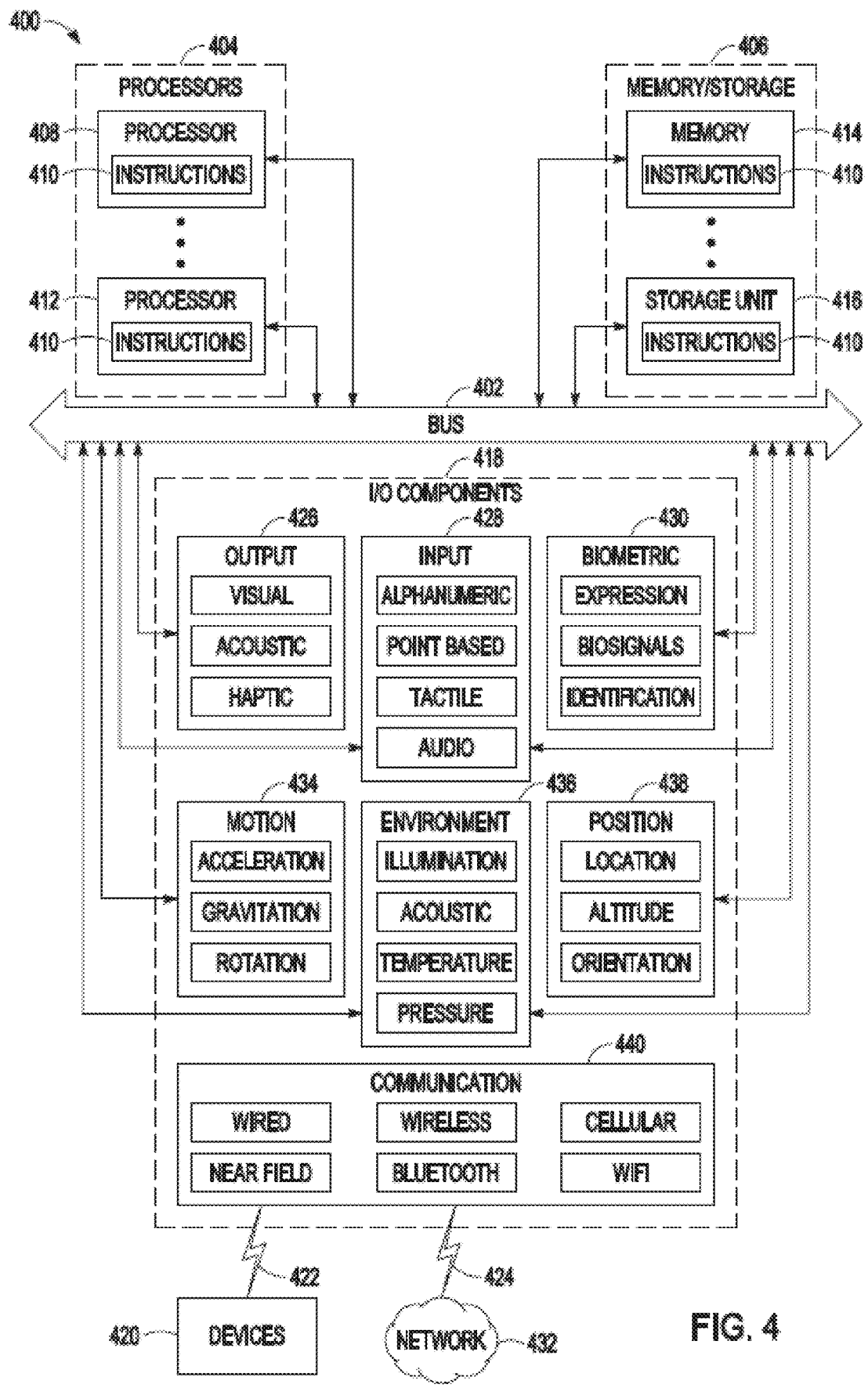
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
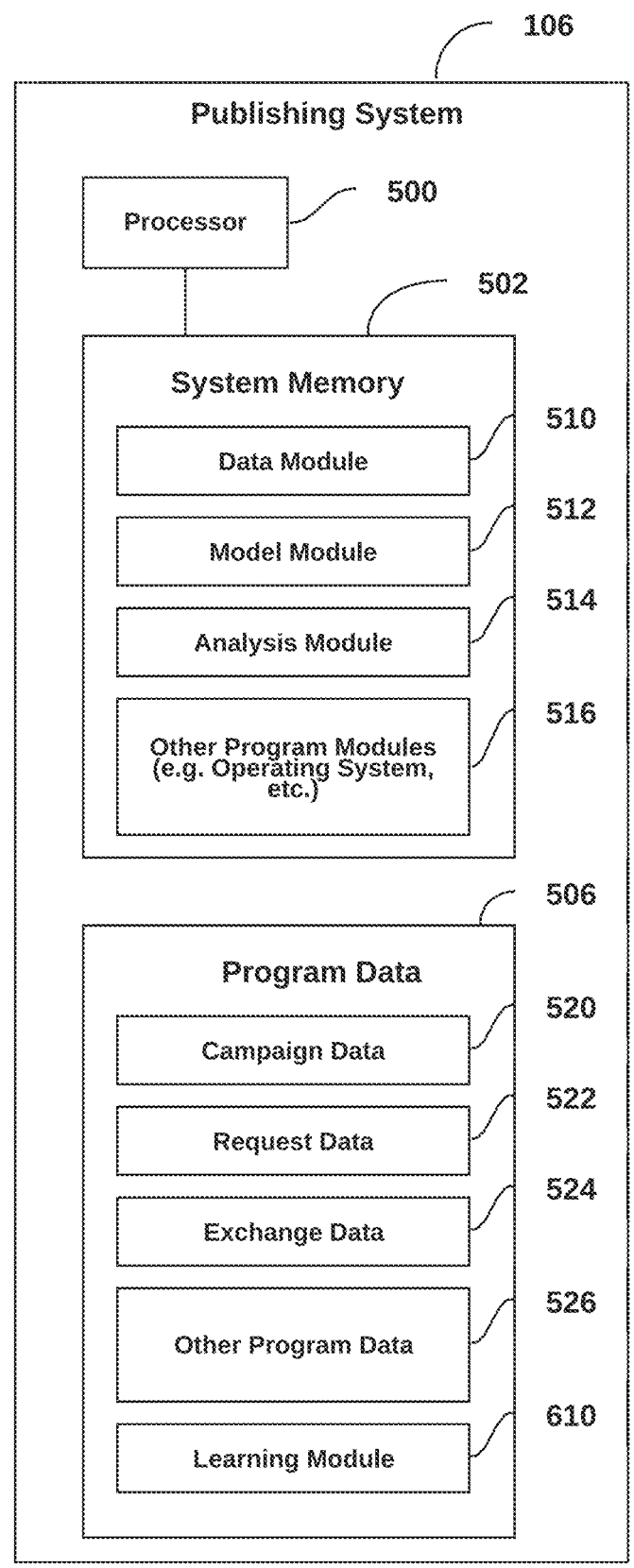
FIG. 5 depicts aspects of a publishing system having integrated learning module, according to various embodiments described herein.

With reference to FIG. 5, the publishing system 106 may include at least one processor 502 coupled to a system memory 504. The system memory 504 may include computer program modules and program data 508. In this implementation, program modules may include a data module 510, a model module 512, an analysis module 514, and other program modules 516 such as an operating system, device drivers, and so forth. Each module 510 through 516 may include a respective set of computer-program instructions executable by one or more processors 502.

This is one example of a set of program modules, and other numbers and arrangements of program modules are contemplated as a function of the particular design and/or architecture of the media request optimization component 230. Additionally, although shown as a single publishing system, the operations associated with respective computer-program instructions in the program modules could be distributed across multiple computing devices. Program data 508 may include campaign data 520, request data 522, exchange data 524, and other program data 526 such as data input(s), third-party data, and/or others. In some examples, publishing system 106 includes a learning module 610, described further below.

In various embodiments, media request data and exchange data for media requests of previously completed media campaigns may be assembled into training samples. The campaigns included in training samples may have one or more characteristics in common with a target campaign. For example, one or more training samples may include media request data for campaigns having particular overpayment ratios, user selected goals, targeting parameters, and the like. The campaigns to include in the training samples may be identified and the learning module 610 may aggregate the request data and exchange data for the media requests in each identified campaign. The request data and exchange data for each media request included in the training samples may be encoded and/or normalized to generate a set of training features.

The learning module 610 may use the training features to train various machine learning modules to predict one or more pieces of optimal request metadata for a target media request and or a target media campaign. For example, the learning module 610 may train a logistic regression or other linear model to determine one or more pieces of optimal request metadata. The learning module 610 may also train non-linear models including a deep learning models such as an support vector data description (SVDD) model, a generative adversarial network (GAN) model, a deep belief network (DBN) model, and the like to determine optimal request metadata.

Figure 6:
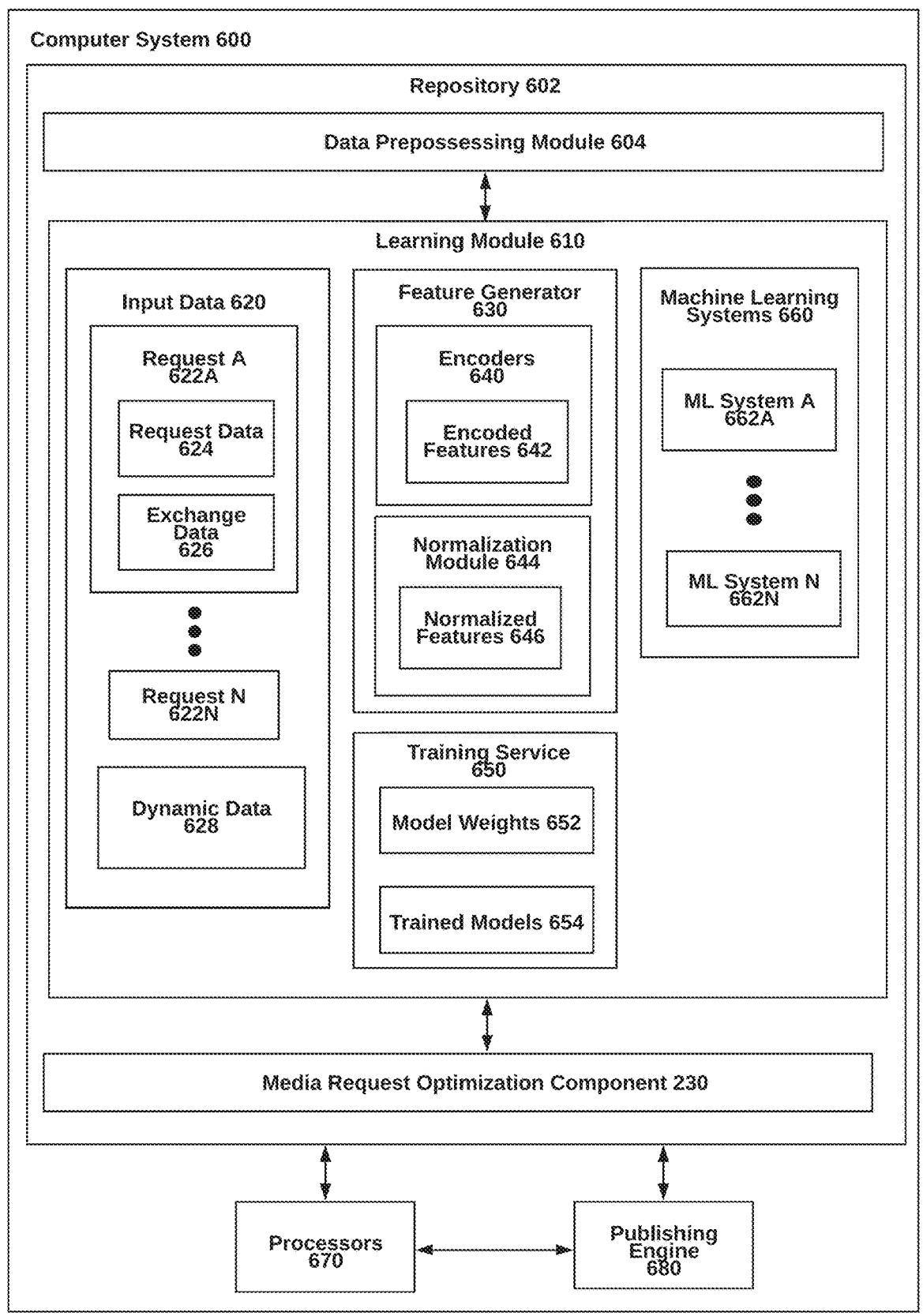
FIG. 6 depicts aspects of a learning module, according to various embodiments described herein.

In various embodiments, ensemble learning may be used to predict an optimized placement price included in the optimal set of media request metadata. The placement prices generated for each campaign media request may be modified based on the predicted optimal placement price to purchase the placements at a lower cost. Modified media requests including the optimal placement price may be submitted to an integrated ad exchange to purchase placements. By using the overpay ratios that are machine learned from a training dataset of exchange data, the media request optimization (e.g., a request optimization module) may optimize media campaign spend to reduce the cost per placement and increase the number of placements purchased in media campaigns. The learning module 610 may also retrain the machine learning systems based on the results of the modified media requests in completed auctions to improve the accuracy of the predicted optimal placement prices and the likelihood modified media requests will procure placements without overpaying FIG. 6 is a block diagram illustrating more details of the learning module 610 in accordance with one or more embodiments of the disclosure. The learning module 610 may be implemented using a computer system 600. In various embodiments, the computer system 600 may include a repository 602, a publishing engine 680, and one or more computer processors 670. In one or more embodiments, the computer system 600 takes the form of the application server 122 described above in FIG. 1 or takes the form of any other computer device including a processor and memory. In one or more embodiments, the computer processor(s) 670 takes the form of the processor 500 described in FIG. 5.

In one or more embodiments, the repository 602 may be any type of storage unit and/or device (e.g., a file system, database, collection of tables, or any other storage mechanism) for storing data. Further, the repository 602 may include multiple different storage units and/or devices. The multiple different storage units and/or devices may or may not be of the same type or located at the same physical site. The repository 602 may include a data preprocessing module 604, the learning module 610, and a media request optimization component 230.

The data preprocessing module 604 includes programing instructions for performing Extract, Transform, and Load (ETL) tasks. The ETL jobs process request data 624 (e.g., targeting parameters, placement attributes, placement prices, outcome probability scores, and the like) and exchange data 626 (e.g., outcomes for requests submitted to an exchange) for multiple sets of media requests 622A, . . . , 622N. The learning module 610 may select media requests 622A, . . . , 622N from one or more target campaigns to include in input data 620 for training the machine learning systems 660. For example, the learning module 610 may assemble training samples by selecting media requests 622A, . . . , 622N from campaigns having one or more particular targeting parameters and/or other configuration attributes and/or one or more particular outcomes of each previously run campaign. The learning module 610 may also assemble training samples by selecting media requests 622A, . . . , 622N having one or more target pieces of request metadata (e.g., auction type, channel, placement price, and the like). For example, the learning module 610 may select media requests 622A, . . . , 622N that were submitted to online exchanges running second price auctions. Training samples may also include exchange data 626 for media requests 622A, . . . , 622N. The exchange data 626 may include placement prices for the actual sale of placements and exchange impression data such as, for example, overpay ratios (e.g., the ratio of the highest submitted placement price (e.g., bid amount) to the actual sale placement price (e.g., the second highest bid amount in the second price auction). Including exchange data 626 in the training samples may enable the machine learning systems 660 to learn the overbid amounts and overbid ratios for media requests based on patterns in the exchange data. Training samples that combine the request data 624 and exchange data 626 may enable the machine learning systems 660 to learn the types of campaigns that produce different overpay ratios.

One or more training samples for the machine learning systems 660 may also include dynamic data 628 that is collected once a target campaign is already running on the publication system. Dynamic data 628 may include updated targeting parameters and other request data 624 that may be changed by users in real time. Dynamic data 628 may also include goal probabilities that are updated from in-progress campaigns. The updated goal probabilities may reflect the likelihood a campaign will achieve one or more pre-defined campaign goals based on the performance of the media requests submitted so far in the campaign and the impression data observed for the campaign media that has already published. The dynamic data 628 may also include request and/or exchange data from media requests that were submitted to placement auctions that have already been completed. The previously submitted media requests may include optimized media requests generated by the media request optimization component. The learning module 610 may use the exchange data and/or request data from the previously submitted optimized media requests for reinforcement learning. For example, the learning module 610 may retrain one or more of the machine learning systems 660 based on the observed performance of the original optimized media request. If the optimized request is successful (e.g., procures a placement with an overpay ratio within a predetermined threshold) the machine learning system may receive positive feedback and if the optimized request is not successful (e.g., does not procures a placement or has an overpay ratio above a predetermined threshold) the machine learning system may receive negative feedback. The positive and negative examples may improve the accuracy of the placement prices generated by the machine learning systems to increase the likelihood the optimized media request will be successful while also minimizing the overpay amounts.

Request data 624 and exchange data 626 included in media requests 622A, . . . , 622N selected by the learning module 610 for training samples are aggregated as input data 620. The training samples may include request data 624 and/or exchange data 626 for multiple media requests 622A, . . . , 622N included in campaigns having one or more target characteristics. The request data 624 for of the each media requests 622A, . . . , 622N may include campaign targeting parameters, placement data for media obtained during the campaign, prices for media placements, outcome probability scores, and the like. The exchange data 626 may include exchange outcomes for media requests (e.g., auction win/lost outcomes) and exchange impression data (e.g., auction settings, overpay amounts for media requests in completed second price auctions, and the like).

The training samples may also include dynamic data 628 determined for one or more media requests that were previously generated in a target campaign. The dynamic data 628 may include exchange outcomes and/or exchange impression data for one or more previously generated media requests in the target campaign (e.g., media requests the were previously submitted to an exchange and have an exchange outcome). The dynamic data 628 may also include one or more goal probabilities for the target campaign that may be updated while the target campaign is running on the publishing system based on exchange outcomes and impression data generated by previously generated media requests. The training samples included in input data 620 may be fed into a feature generator 630 that determines training features for training one or more machine learning systems 660. Table 1 below illustrates example request data 624 and table 2 below illustrates example exchange data 626.

TABLE 1

| Column Name: | Brief description and/or use of the column: |
| --- | --- |
| Event types | used to filter out events that are "media requests" |
| Account ID | used to identify the Ad-exchange from where the media request came |
| Page ID | a unique identifier of the webpage where the ad is to be displayed |
| Page category | an identifier of the webpage and the categorization confidence provided by the ad-exchange |
| Zip code | zip code of the user for whom the ad's bid price is to be calculated |
| City code | city of the user for whom the ad's bid price is to be calculated |
| Country code | country of the user for whom the ad's bid price is to be calculated |
| Request ID | a unique identifier generated from our system to identify this media request and event across our databases |
| Placement Cost | the price of the bid computed by our model services based on the profile of the user and properties of the ad |
| Placement ID | The identifier of a placement object. A placement is a slot on a Web page where the ad is shown |
| Model ID | Model id, version, and type for each model evaluated, and the bid type |
| Impression Probability Score | A probablity (a number between 0 and 1) by the estimation model predicting the number of clicks or conversions for this ad |
| DMA Code | Designated Market Area. Typically a region larger than a city. |
| State Code | The state where the user is located |
| User Time Zone | The time zone that the user is in |
| Client Timestamp | The current local time of the user |
| Device info | Information of the the device the user is using, type (laptop/mobile/tv), make and model of the device, the Operating System, the brower/app details, etc |

TABLE 2

| Column Name: | Brief description and/or use of the column: |
| --- | --- |
| Request ID | a unique identifier generated from our system to identify this media request and event across our databases. This is the field that is used to match and collate details between RTBids table and Impressions Table |
| Bid Winning Price | This is the price that we end up paying. For $1^{st}$ price auctions it is usually the price we bid (Bid Cost in RT Bids table), but usually a lower price for $2^{nd}$ price auctions. |
| RTB impression details | Misc. Information about the impression including exchange settings and overpay amounts |

One or more of the data fields included in request data 624 and/or exchange data 626 may be generated by one or more of the machine learning systems 660. For example, the impression probability score field included the request data 624 may be a probability score that indicates the likelihood a particular impression event will occur if a piece of campaign media published in a particular placement. For example, the impression probability score may include the probability a user will click on, view, watch to completion, or otherwise interact with a piece of media displayed in the placement object requested by the media request (e.g., the placement object identified by the placement ID field included in the request data 624). The impression probability score may be generated by one or more linear machine learning models (e.g., linear regression, ridge regression, logistic regression, linear support vector machines (SVM), and the like) and/or deep learning models (e.g., non-linear SVM, SVDD models, GAN models, DBN models, and the like).

In various embodiments, the impression probability score may be generated by a logistic regression model that predicts the probability an outcome will occur once media is displayed at a placement. The logistic regression model may be trained on a training data set that includes campaign features (e.g., targeting parameters, budgeting parameters, channel preferences, campaign outcomes and the like), audience features (e.g., intender attributes, such as, for example, demographic attributes, subject matter interests, online browsing tendencies, product affinity scores, brand affinity scores, and the like) of individual users targeted by the campaign, and creative attributes (e.g., image features of image creative, NLP features for text creative, and the like) of the displayed media for a sample of successful media requests (i.e., media requests that won an auction for a placement and resulted in display of a piece of media in the placement object). The training dataset may also include an impression outcome for each obtained placement. For example, the impression outcomes may indicate if the piece of media displayed at the placement obtained by a media request resulted in a view, click, conversion, watch to completion, or other impression event or not. The impression outcomes for each media request may be extracted from impressions data that includes a record of user interactions with media that is published at each placement obtained by a media request. A selection of the campaign features, audience features, and/or creative attributes that are predictive of a particular outcome may be the independent variables and the desired outcome may be the dependent variable of the logistic regression model.

During the training process, the weights of each of the independent variable may be initialized with random values and optimized using an optimization algorithm (e.g., gradient descent) that determines the values of the weights for each independent variable that minimizes the difference between the outcomes predicted by the model and the known outcomes associated with each media request. The weights that result in the smallest difference between the predicted outcomes and the known outcomes may be used by the trained logistic regression model at run time to predict the probability an outcome will occur for a new media request. For example, a trained conversion model may determine the probability a new media request will result in a conversion event. A trained viewability model may determine the probability a new media request will result in the media displayed at the requested placement being viewed by a user. A trained click through rate model may determine the probability a new media request will result in a click by a user. A trained video completion rate model may determine the probability a new media request will result in a user watching a piece of video media to completion.

One or more non-linear models may also be used to generate the impression probability scores. In various embodiments, a deep learning model (e.g., a non-linear SVM model, SVDD model, GAN model, DBN model, and the like) may transform n-dimensional feature vectors including a selection of campaign features, audience features, creative features for sample of successful media requests, and the outcomes achieved for each media request into an m-dimensional representation of media requests that provide the desired outcome (e.g., a view, click, conversion, watch to completion, and the like). During training, the parameters of one or more layers of the deep learning model may be modified by adjusting the weights for each parameter to reduce a loss value (e.g., the difference between the input feature representation of media requests providing the desired outcome and the feature representation of the target media requests generated by the deep learning model). In various embodiments, a gradient decent algorithm or other optimization algorithm may be used to determine the weights for each parameter of the deep learning model that generates the lowest loss value.

Outcome probability scores from each of the different models (e.g., the conversion model, the click through rate model, the viewability model, the video completion rate model, and the like) may be included in request data 624 and used as features for one or more other machine learning systems used to determine a set of optimal request metadata for media requests. A model ID field included in the request data 624 may identify the specific model generating each impression probability score. In various embodiments, scores from multiple linear and/or non-linear models may also be ensembled or otherwise combined to generate combined impression probability scores that may indicate the probability that multiple impression events will occur.

A placement cost field included in request data 624 may also be generated based on the impression probability scores. For example, the campaing settings for a media campaign may include a cost per impression event (e.g., cost per click, cost per conversion, cost per view, cost per completed video, and the like). The placement cost may be determined by multiplying the cost per outcome by the probability score for that impression event. For example, a campaign that specifies a goal of $5 per conversion event and a media request having a predicted conversion probability score of 0.01 may produce a placement cost of $0.05. The placement cost included in the request data 624 may also be used as a feature for training the machine learning systems 660 used to optimize media requests.

Figure 7:
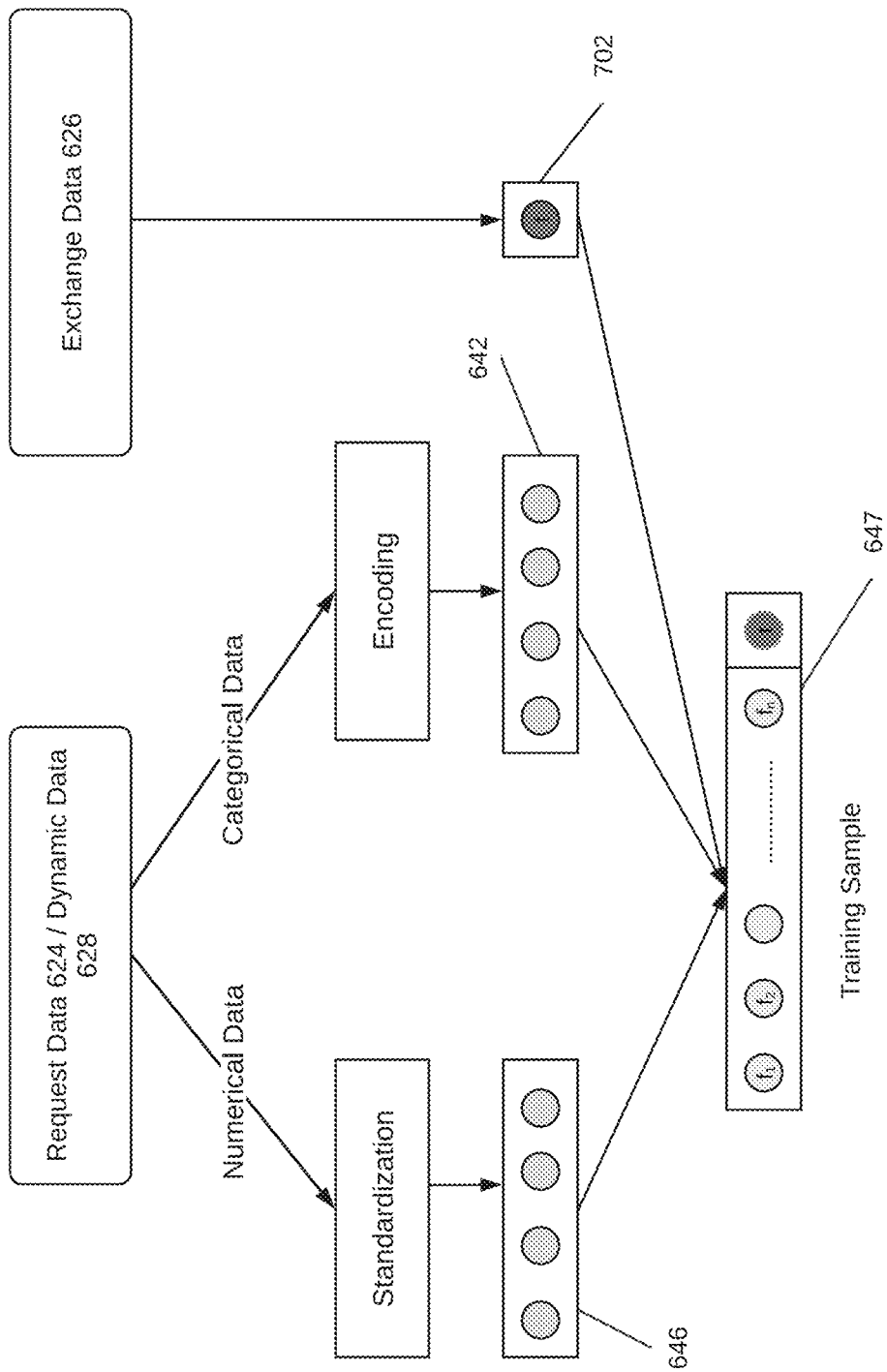
FIG. 7 illustrates more details of a feature generation routine, according to various embodiments described herein.

The feature generator 630 may calculate model features from the request data 624, exchange data 626, and/or dynamic data 628. The model features may be used by the training service 650 to train one or more machine learning systems 660. The feature generator 630 may include a normalization module 644 and an encoder 640 that are used to generate the model features. FIG. 7 illustrates more details of the feature generation process performed by the normalization module 644 and the encoder 640. The normalization module 644 may transform the numerical data fields included in the request data 624 and/or dynamic data 628 into normalized features 646 by determining a scaled value (e.g., a value between −1 and 1) for each of the of the numerical data fields (e.g., each unique value of a particular numerical data field). For example, each unique bid cost amount in the request data 624 may be multiplied by a scaling factor to determine normalized features 646 (e.g., values between −1 and 1) for each bid cost amount. In another example, each unique goal probability in the dynamic data 628 may be multiplied by a scaling factor to determine normalized features 646 for each goal probability value.

To transform the categorical data fields into features, one or more encoders 640 may compute one or more encoded features 642 for each categorical field. In various embodiments, the categorical fields may not have an ordinal relationship so the encoders 640 may apply one hot encoding to the categorical data. The categorical data fields may be one hot encoded by first assigning each categorical variable (e.g., each unique value) for a particular categorical data field an integer value. For example, to one hot encode the operating system type device info data field, a value of "1" may be assigned to the IOS operating system type, a value of "2" may be assigned to the Android operating system type, and a value of "3" may be assigned to the Windows operating system type. A one hot encoding may be applied to this integer representation by removing the integer encoded variable and adding a new binary variable for each unique integer value (e.g., "1,0,0" for the integer value of "1", "0, 1,0" for the integer value of "2" and "0,0,1" for the integer value of 3). This one hot encoding process may be repeated for each categorical data field that does not have an ordinal relationship. The encoders 640 may also encode categorical fields that have an ordinal relationship (i.e., are in number order) by applying an integer encoding that converts each unique value for the categorial field into an integer.

The encoded features 642 and normalized features 646 generated by the feature generator 630 may be aggregated into feature vectors. The feature vectors may include a matrix, array, or other numerical representation of the request data 624, exchange data 626, and/or dynamic data 628 for the media requests 622A, . . . , 622N included in input data 620. For example, the feature generator 630 may concatenate the encoded features 642 and normalized features 646 into a single n-dimensional vector for each media request. The feature generator 630 may also generate training samples 647 by combining the features vector for a media request with a prediction target 702 for the media request. In various embodiments, the prediction target 702 may be the placement sale price for each of the media requests 622A, . . . , 622N. The placement sale price may be extracted from the exchange data 626 of each request and added to the training sample 647. The machine learning systems 660 (e.g., a price prediction model) may be trained to predict the placement sale price for each of the media requests based on patterns in the features generated from the request data 624, exchange data 626, and/or dynamic data 628 that are machine learned.

The prediction target 702 may also include one or more price derivatives that may be determined from the placement sale price (e.g., price reduction ratio, overpay amount, and the like). The price reduction ratio may be a ratio of the placement sale price to the final placement price for a media request (e.g., the placement price). For example, if the placement sale price is $0.86 and the final placement price in a media request is $1.20, the price reduction ratio may be $0.86/$1.20 or 0.72. The training sample used to train the price prediction models to predict the price reduction ratio or other price derivative includes the price reduction ratio or other predicted price derivative as the prediction target 702. In various embodiments, the price derivative may be determined by the feature generator 630 based on the placement sale price included in exchange data 626 and the final placement price included in request data 624.

Figure 8:
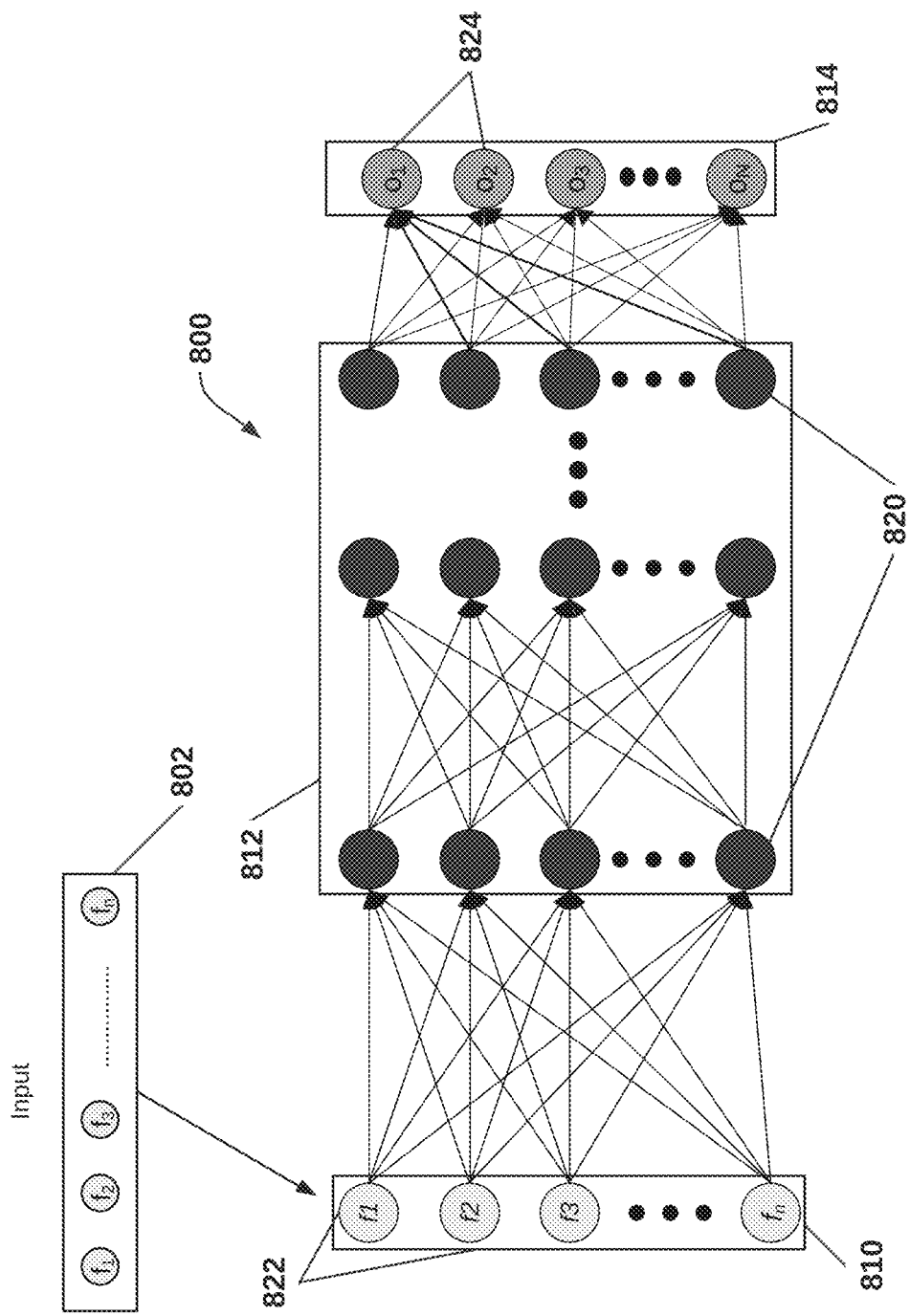
FIG. 8 illustrates more details of a price prediction model, according to various embodiments described herein.

In various embodiments, the training service 650 may execute multiple training routines to generate different machine learning systems 660. The machine learning systems 660 that generate price predictions (e.g., the price prediction models described above) may be a logistic regression or other linear model. The training service 650 may also train non-linear models including one or more deep learning models such as a neural network, a support vector data description (SVDD) model, a generative adversarial network (GAN) model, a deep belief network (DBN) model, and the like. For example, the training service 650 may train a request optimization model that determines optimal request metadata for media requests. FIG. 8 illustrates more details of the neural network 800 request optimization model. The neural network may include an input layer 810, multiple hidden layers 812, and an output layer 814. Each layer may include one or more nodes. In various embodiments the input layer nodes 822 may correspond to the number of features in the in feature vector (e.g., the n-dimension representation of a media request) provided by the feature generator 630 and the output layer 814 may contain one or more output layer nodes 824 that provides numerical and/or categorical predictions for one or more request metadata fields. For example, the output layer nodes 824 may output a numerical prediction (e.g., a price prediction) on a continuous scale. The output layer nodes 824 may also include an n number of categorization nodes with one node for each possible class output. A softmax function may be applied to each of the categorization node for each unique piece of categorical request metadata predicted by request optimization model so that all of the raw scores output by the categorization nodes sum to 1 and the node with the highest probability is determined to be the predicted class. For models that determine numerical values, the output layer 814 may be configured to have a number of output layer nodes 824 that corresponds to each piece of request metadata predicted by the model. For models that determine categorical values, the output layer 814 may be configured to have a number of output layer nodes 824 that equals the number of classes for each categorical variable. Multiple models may be used to determine optimal request metadata that includes categorical and numerical values with one or more models determining the categorical metadata fields and one or more models determining the numerical metadata fields.

During training, the training service 650 may initialize the weights for each of the parameters in each of hidden layer nodes 820 included in the hidden layers 812 using an initializer (e.g., a normal initializer that assigns random values for weights in a normal distribution). In various embodiments, initializing the nodes of the hidden layers 812 may involve determining at least one initial value of one or more weights for hundreds of thousands of trainable parameters. An activation function (e.g., a rectified linear unit (ReLU) activation function, sigmoid activation function, hyperbolic tangent (tan h) activation function, and the like) may be used to determine the output of the hidden layers 812 by calculating the weighted sum of the model features included in each of the output layer nodes 820. A second activation function (e.g., a linear activation function, softmax activation function, and the like) may be selected for the output layer 814 and used determine the output of the model (e.g., a price prediction or other numerical value, an auction type of other categorical value, and the like) by calculating the weighted sum of each of the output nodes 824.

In one embodiment, to train a price prediction model, a training sample of feature vectors for media requests that obtained placements in second price auctions are input into the model. A price prediction for each media request included in the sample is generated by the neural network 800. The predicted prices are compared to a target price for each media request (e.g., the known price or price derivative determined from the exchange data) using a loss function (e.g., mean absolute error). During each training epoch, the weights of the parameters of each hidden layer node 820 are modified and the value for the loss function calculated using the price predictions generated during that cycle is measured. At the end of a training cycle, the values of the parameter weights that minimize the value of the error calculated using the loss function are determined to be the trained model weights 652. The machine learning systems 660 may include one or more trained models 654 assembled by applying the trained model weights 652 to each of the model parameters. The trained models 654 (e.g., the trained neural network) may be validated on a validation sample of media requests.

During validation, the weights for each of the parameters in the hidden layer nodes 820 are set to the trained model weights 652 and the neural network generates a price prediction for each of the media requests included in the validation sample. The validation loss (e.g., the error value for the loss function) of the price predictions generated by the trained neural network is determined and may be compared to validation threshold. If the validation loss is below the validation threshold, the neural network model may be deployed for testing and/or production. If the validation loss exceeds the validation threshold, the training service 650 may retrain the model on the training sample for one or more additional training cycles. The training service 650 may also modify one or more aspects of the training data (e.g., feature vectors for more media requests may be added, one or more features may be removed from or added to the feature vectors, and the like) and/or or deep neural network (e.g., one or more parameters of the hidden layers may be modified, the number of hidden layers may be modified, and the like) and retrain the neural network. The training service 650 repeat the training and validation process described above using the updated training data and/or modified neural network until the validation loss measured for the validation sample is below the validation threshold.

After training and validation, the training service 650 may use the trained model weights 652 to assemble one or more trained machine learning models 654. The trained machine learning models 654 may be incorporated into one or more machine learning systems 660 (e.g., ML System A 662A, . . . , model N 662N) that are deployed to production. A media request optimization component 230 may inference one or more of the machine learning systems 660 in order to optimize media requests for a media campaign. In various embodiments, the media request optimization component 230 may review each media request generated for a media campaign and modify one or more of pieces of request metadata (e.g., placement price, auction type, channel, and the like) included in the request based on predictions generated by the machine learning systems 660. For example, the media request optimization component 230 may generate an optimized media request that includes a predicted placement price and the optimized media request may be submitted to an ad exchange that resolves auctions for media placements. Optimized media requests that are resolved successfully (e.g., include winning placement prices amounts) may route the ad placements obtained by the request to a publishing system that publishes media in the obtained ad placements.

Figure 9:
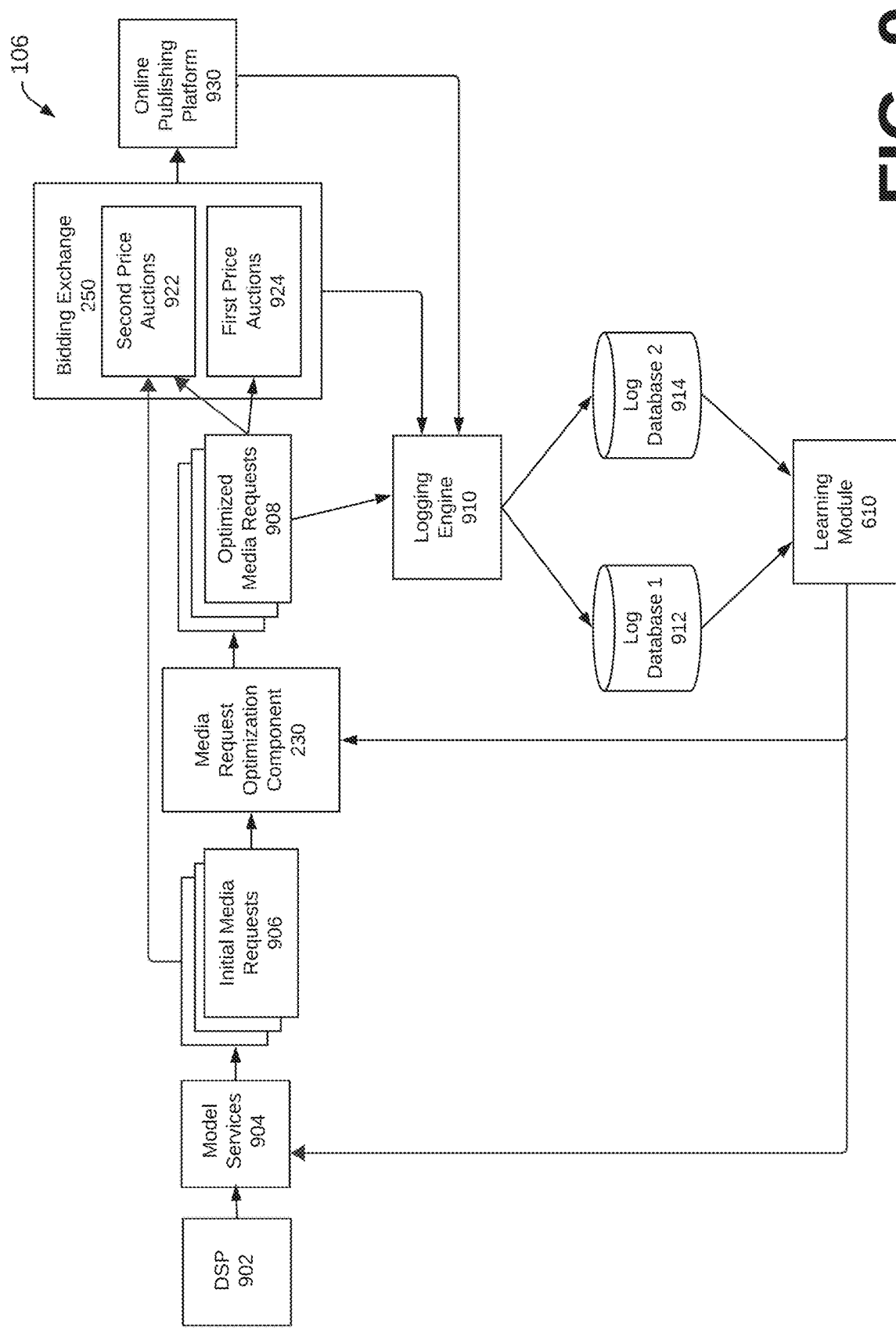
FIG. 9 illustrates more details to a publishing system that includes a price prediction model, according to various embodiments described herein.

FIG. 9 illustrates more details of the publishing system 106 shown in FIGS. 1 and 2. The publishing system 106 may use price predictions generated by the machine learning systems 660 to optimize media requests used to obtain media placements. The publishing system 106 includes model services 904 that receive media requests for placements from a demand side platform (DSP) 902. The media requests may be generated by the DSP 902 based on one or more campaign settings for a media campaign running on the publishing system 106. The model services 904 may use one or more machine learning systems of the learning module to generate an initial set of request metadata for each media request. The initial set of request metadata may include, for example, an initial placement price, an auction type, and/or a channel determined by the machine learning systems 660. The request metadata determined by the machine learning systems may be added to and/or used to modify one or more pieces of request data included in the media request.

In various embodiments, the machine learning systems may use one or more logistic regression models or other linear models and/or a deep neural network or other non-linear models to determine the request metadata as described above. For example, the machine learning systems may include a price prediction model that may predict a placement price based on one or more patterns that are machine learned from request data and impressions data for a sample of media requests (e.g., media requests that obtained media placements in a bidding exchange). To predict the placement price for a target media request, model services 904 may use one or more machine learning systems to determine an outcome probability score for the target media request. The machine learning systems may determine outcome probability scores using a machine learning model trained on a training dataset including features determined from the request data (campaign features, audience features, ad creative attributes, and the like) and/or impression data (event histories that record user interactions with media published at previously obtained placements) included in a training sample of media requests having one or more attributes in common with the target media request. The model services 904 may determine the placement price for the target media request by multiplying the outcome probability score from the machine learning models by a price per outcome for the target media request specified in request data.

The placement prices determined by model services 904 may be an initial placement price for the initial media requests of a media campaign and the initial placement price may be included in the initial request metadata of the initial media requests 906. The initial placement price reflects the raw value of the placement to a publisher. This raw value is based on the probability displaying campaign media at the placement will result in a desired outcome and the maximum amount the publisher is willing to pay for that outcome. A portion of the initial media requests 906 having the initial placement price may be submitted by the DSP 902 to a second price auction conducted on a bidding exchange 250 to generate dynamic data that may be used to further optimize the media requests.

A logging engine 910 may monitor the bidding exchange 250 to track outcomes of the second price auctions 922 that received the initial media requests 906. For example, the logging engine 910 may retrieve exchange data including request outcomes (e.g., whether the media request obtained a placement or not), the placement sale price, and/or exchange impression data including overpay ratios for second price auctions 922. The logging engine 910 may also monitor the online publishing platform 930 that publishes content including the placements to track the impression data generated by displaying the placements that include campaign media to users. For example, the logging engine may collect clicks, views, conversions, and other impression events for each placement obtained by one of the media request. The Exchange data and impression data collected by the logging engine 910 may be stored in the log database 1 912 and log database 2 914 respectively.

The logging engine 910 may provide the exchange data and the impression data collected for the initial media request 906 to the learning module as input data 620 that may be assembled into one or more training datasets. For example, the learning module may assemble a training sample that includes the collected exchange data and initial request metadata and other request data for the initial media requests. The learning module may then train one or more machine learning systems used by the media request optimization component 230 to determine an optimal set of request metadata using the initial request training sample. The learning module may also use the impression data collected for placements obtained by the initial media requests 906 to determine updated goal probabilities for the campaign. The updated goal probabilities may be added to the initial request training sample that used to train the one or more machine learning systems used by the media request optimization component 230.

The initial request metadata included in the initial media requests 906 may be modified by the media request optimization component 230 based on the dynamic data collected by the logging engine. For example, the media request optimization component 230 may generate a set of optimal request metadata that may revise one or more pieces of the initial request metadata. The optimized request metadata may be included in one or more optimized media requests 908. In various embodiments, the media request optimization component 230 may update the initial placement price to an optimal placement price that reflects the true value of a placement. The optimal placement price may improve the accuracy and certainty of placement price predictions by augmenting impression outcome and cost per outcome based initial placement price with real time insights from dynamic data (e.g., real time market conditions and updated goal probabilities).

In various embodiments, the media request optimization component 230 determines the optimal placement price and other pieces of optimial request metadata based on patterns that are machine learned from the request data, exchange data, and/or dynamic data for a sample of media requests (e.g., the initial media requests that were submitted to the second price auctions). The optimal request metadata may be generated using one or more machine learning systems that are trained using a training dataset having multiple feature vectors determined from a sample of media requests. The feature vectors may include campaign features, audience features, ad creative attributes, and other features determined from request data, placement sale prices, request outcomes, exchange impression data, and other features determined from real time exchange data, and goal probabilities and other features determined form dynamic data. The media request optimization component 230 may use one or more machine learning system to determine be a placement price that may be added to the optimal request metadata of an optimized media request. The media request optimization component 230 may also use one or more machine learning systems to determine a placement price reduction ratio equivalent to a predicted amount of overpayment in a second price auction. The media request optimization component 230 may determine an optimal placement price by multiplying the initial placement price by the placement price reduction ratio. The optimal placement prices determined by the media request optimization component may reduce the amount of overpayment for media placements and reduce the overall spend per media placement for a media campaign.

The media request optimization component 230 may also determine one or more other pieces of request metadata including, for example, auction type and/or channel. The learning module may train one or more machine learning systems (e.g., goal prediction models) on a training sample of media requests and dynamic data for completed and/or in progress campaigns. The trained machine learning systems may recognize the impact of placement sale price, auction type, and channel on different classes of campaign goals (e.g., budgeting goals, media performance goals (e.g., click through rate, impression rate, and the like) for campaigns are at various stages of completion. The trained machine learning system may use one or more goal prediction models to determine a goal probability for a target campaign that is in-progress (e.g., a campaign that submitted a batch of initial media requests to a bidding exchange). If the determine goal probability is below a success threshold, the media request optimization component 230 may adjust the mix of auction type and/or channel for the target campaign use the goal prediction models to determine an updated goal probability for the target campaign. The process of determine the goal probability and adjusting the mix of auction type and/or channel may be repeated until the goal probability for each of the user specified goals for the target campaign is maximized. The mix of auction type may correspond to an amount (e.g., a percentage) of media requests routed to second price auctions and an amount of media requests routed to first price auctions. The channel mix may correspond to an amount (e.g., a percentage of media requests that are routed to different media channels (e.g., web display, mobile display, streaming tv, streaming audio, and the like). The mix of auction type and channel may be included in the optimal campaign metadata that is used to determine the optimized media requests 908.

The media request optimization component 230 may generate optimized media requests 908 by using the optimal request metadata to modify the initial media requests 906. For example, the media request optimization component 230 may update the initial placement price to the optimal placement price. The media request optimization component 230 may also update the auction type and/or channel for each of the initial media request based on the auction type mix and/or channel mix included in the optimal request metadata. For example, if the optimal request metadata includes an auction type mix of 70% second price auction and 30% first price auction, the media request optimization component may adjust the optimized media requests to ensure 70% of the media requests include second price auction type in request metadata and are submitted to second price auctions and 30% of the media requests include a first price auction type in request metadata and are submitted to first price auctions. The optimized media requests 908 are submitted to auctions on one or more bidding exchanges 250 according to the instructions (e.g., auction type and/or channel) included in the optimal media request metadata and the placement price of each request (e.g., the highest and final bid price in the auction) is set to the optimal placement price.

In various embodiments, one or more reinforcement learning techniques may be used to improve the performance of the machine learning systems used by the media request optimization component 230. The machine learning systems used to determine optimal request metadata may be retrained based on feedback received on the optimized media requests 908 submitted to a bidding exchange 250. A logging engine 910 may monitor the bidding exchange 250 to track outcomes of auctions that resolve optimized media requests 908. For example, the logging engine 910 may collect exchange data including the optimal placement price, actual placement sale price, auction outcomes (e.g., won/lost) from auctions that received optimized media requests 908, and the like. The logging engine 910 may also collect request data for the optimal media requests and dynamic data such as, for example, impression data for placements obtained by the optimized media requests 908 and updated goal probabilities. Exchange data collected by the logging engine 910 may be stored in the log database 1 912 and request and dynamic data may be stored in log database 2 914.

To retrain one or more machine learning systems, the logging engine 910 may provide request data, dynamic data, and/or exchange data related to the optimized media requests 908 to the learning module as input data that may be assembled into one or more training datasets. The feature generator may determine feature vectors from the request data, dynamic data, and/or exchange data. For example, the feature generator may generate a feature vector for each optimized media request 908 resolved by the bidding exchange 250. The feature vector may include one or more features determined from the request data, dynamic data, and/or exchange data for media requests having one or more characteristics (e.g., media requests submitted to price first auctions). The feature vector may also include a prediction target (e.g., a winning bid price, price derivative, goal probability, impression event rate, and the like) determined from the request data, exchange data, and/or dynamic data. The feature vectors may be assembled into datasets for retraining that include a sample of optimized media requests that have been resolved within a predetermined period of time (e.g., in the last 30 days, 60 days, 90 days, or any other time period). The training service 650 may retrain one or more of the machine learning systems 660 using the retraining datasets. For example, the training service may retrain the machine learning models on a retraining dataset determined from optimized media requests submitted to price first auctions to learn insights from recently completed first price auctions that may impact a desired prediction target. The retraining process ensures that the weights of the trained models 654 incorporated into the machine learning systems 660 are determined using the most recent data available. The retraining process also ensures that the machine learning systems 660 and will perform well in a variety of auction types (e.g., both second price auctions and first price auctions) because the trained models have been trained on exchange data and dynamic data collected from first price and second price auctions. The retraining process reinforces the predictions generated by the machine learning systems with real time feedback from actual auctions run on one or more bidding exchanges to improve the accuracy and certainty of the optimal placement prices and other pieces of optimal media request metadata determined by the media request optimization component 230.

By incorporating predictions from multiple machine learning models, the publishing system 106 may determine the optimized request metadata for each media request based on intelligence gleamed from multiple dimensions. The initial placement price generated by the model services 904 optimizes placement prices based audience targeting parameters included in request data and user impression outcomes. Accordingly, the initial placement price reflects the optimal price per placement to achieve a specific cost per outcome, impression rate, or other goal of a media campaign regardless of the true market value of the placement. The modifications to the initial placement price determined by the media request optimization component 230 enhance the initial placement price by adding a second dimension of insights determined from additional data (e.g., exchange data including the amount of overpayment in second price auctions and other cost inefficiencies that are incurred during the auction process and/or dynamic data including real time market conditions and goal probabilities that are updated based on the real time performance of a campaign). Accordingly, the optimal placement price augments the raw value of a placement to a publisher based on the placement's audience and publisher's budget with actual impression outcomes and exchange outcomes to reflect a more accuracy representation of the true value of a placement at a particular point in time. Market conditions are always changing so the value of placements changes rapidly. The media request optimization module is designed to adjust the optimal placement price based on the changing conditions by incorporating dynamic data that reflects the real time market environment for a placement and real time performance of campaign media.

The ensemble learning approach used to determine the optimal request metadata ensures the optimal placement price and other pieces of optimal metadata are determined based on multiple goals including campaign goals that specify a certain price per outcome and price efficiency goals that eliminate cost inefficiencies of the auction process. The architecture and process for using multiple models to determine optimal media request metadata implemented by the media request optimization component improves upon existing machine learning systems by enabling insights from multiple datasets to be leveraged in order to generate a single prediction target (e.g., a optimal placement price and/or set of optimal request metadata). The ensemble model architecture of the machine learning systems used by the media request optimization component is highly flexible to enable different combinations of linear and non-linear machine learning models to identify machined learned patterns in different datasets. The type of machine learning model used learn the insights from each dataset may be modified to optimize the performance (e.g., speed, reliability, processing efficiency, and the like) of the publishing system and the accuracy and/or performance (e.g., win rate, impression event rate, and the like) of media requests and/or media campaigns.

Figure 10:
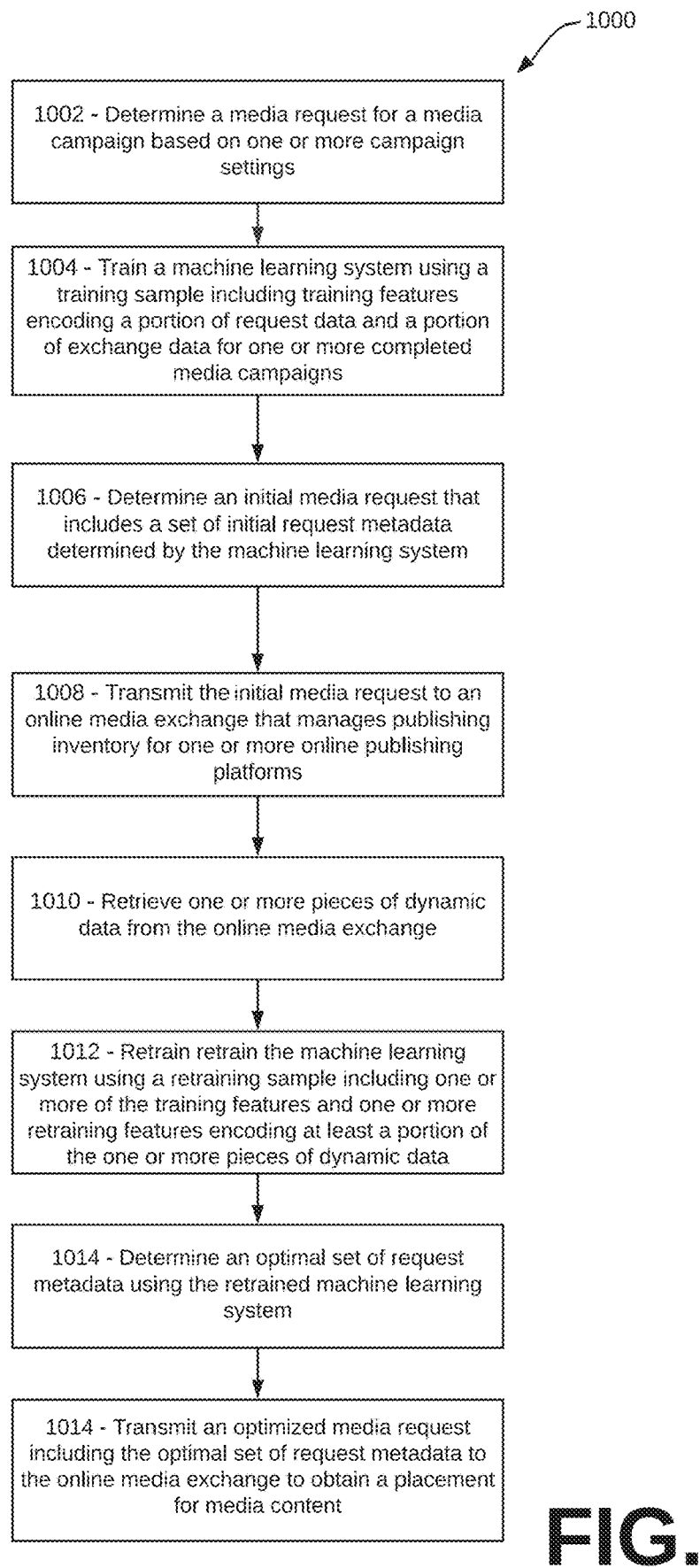
FIG. 10 is a flow chart depicting operations in a method, according to an example embodiment.

Some present examples also include methods. FIG. 10 is a block diagram of a process 1000 of optimizing media requests. At step 1002, a DSP may determine a media request for a media campaign based on one or more campaign settings (e.g, targeting parameters, budgeting parameters, and the like). At step 1004, a learning module may train a machine learning system using a training sample including training features encoding a portion of request data and a portion of exchange data for one or more completed media campaigns. To train the machine learning system, the learning module may assemble training samples that include sets of media requests from one or more completed campaigns having one or more target characteristics. The training features may encode at least a portion of the request data of the sets of media requests. The training features may also encode a least a portion of the exchange data collected for the one or more completed campaigns.

At step 1006, the DSP may determine an initial media request that includes a set of initial request metadata determined by the machine learning system. At step 1008, the initial media request may be transmitted to an online media exchange (e.g., an online bidding exchange) that manages publishing inventory for one or more online publishing platforms.

At step 1010 a logging engine may retrieve one or more pieces of dynamic data from the online media exchange. The one or more pieces of dynamic data may be related to the transmitted media request and may include, for example, real time exchange data for the initial media requests that were submitted to the online media exchange, real time impression data for placements the were obtained by the initial media requests and displayed to users on an online publishing platform, and/or one or more goal probabilities for the media campaign that may be determined based on the real time impression data and/or real time exchange data. The one or more goal probabilities may be determined by a machine learning system trained on a goal prediction training dataset including goal prediction features that encode one or more pieces of request data and/or exchange data for one or more completed campaign. The goal prediction training dataset may also include one or more goal outcomes for the one or more completed campaigns as a prediction target. The goal probabilities predicted by the machine learning system trained on the goal prediction training set may correspond to the probability that an in-progress media campaign will achieve one or more pre-determined campaign goals (e.g., one or more user specified campaign goals included in the campaign settings).

At step 1012, the learning module may retrain the machine learning system using a retraining sample including one or more of the training features and one or more retraining features encoding at least a portion of the one or more pieces of dynamic data. At step 1014, the media request optimization component may determine an optimal set of request metadata using the retrained machine learning system. The optimal set of request metadata may modifying one or more pieces of the initial set of request metadata included in the initial media request. At step 1016, the DSP may transmit an optimized media request including the optimal set of request metadata to the online media exchange to obtain a placement for media content that is displayed on a client device. If the optimized media request is resolved successfully by the online media exchange (e.g., the optimized placement price is the highest bid for a placement at the end of an auction), the placement may be obtained by the optimized media request. For each obtained placement, the DSP may provide one or more pieces of campaign content to the online publishing platform and the online publishing platform may publish the one or more pieces of content that include in the one or more pieces of provided campaign content.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A media request optimization system comprising:
one or more processors; and
a memory storing instructions that, when executed by at least one processor in the one or more processors, cause the at least one processor to perform at least the following operations during an in-progress media campaign:
encode one or more pieces of request data and one or more pieces of exchange data for a media request included in a completed media campaign in a feature vector, the encoding using an encoder and the feature vector being representative of at least a portion of the request data and a portion of the exchange data of the media request;
generate a feature vector for multiple media requests of the completed media campaign to create a training sample including a set of feature vectors;
train a first machine learning system using the training sample including the set of feature vectors;
determine an initial media request using the first machine learning system;
transmit a set of multiple initial media requests generated by the first machine learning system to an online media exchange that manages publishing inventory for one or more online publishing platforms;
receive one or more pieces of dynamic data related to the transmitted set of initial media requests from a logging engine configured to monitor the online media exchange, the one or more pieces of dynamic data including one or more impression events and one or more exchange outcomes recorded by the online media exchange for an in-progress campaign running on the online media exchange, the in-progress campaign including a portion of the media campaign that has been completed;
update one or more goal probabilities for the in-progress campaign based on the one or more impression events for the in-progress campaign and one or more pre-defined campaign goals of the media campaign;
encode one or more pieces of dynamic data received from the logging engine, the one or more updated goal probabilities, and one or more pieces of request metadata for multiple initial media requests of the in-progress campaign in a feature vector for the in-progress campaign, the feature vector for the in-progress campaign including a portion of the dynamic data received for the multiple initial media requests, at least one updated goal probability, and a portion of the request metadata;
generate a feature vector for the in-progress campaign for multiple initial media request to create a re-training sample including a set of feature vectors to the in-progress campaign;
train a second machine learning system using the re-training sample;
determine an optimal set of request metadata using the retrained second machine learning system, the optimal set of request metadata modifying one or more pieces of the initial set of request metadata; and
transmit an optimized media request including the optimal set of request metadata to the online media exchange to obtain multiple placements for media content that are displayed on one or more client devices, the optimized media request optimizing the multiple placements obtained from online media exchange for the one or more pre-defined campaign goals.

2. The system of claim 1, wherein the initial media request includes an initial placement price determined by combining an outcome probability score determined by the first machine learning system and a cost per outcome for the media request.

3. The system of claim 1, wherein the first and second machine learning systems use a neural network to determine at least one of the initial media request and the optimal set of request metadata.

4. The system of claim 1, wherein the first and second machine learning-systems use a logistic regression model to determine at least one of the initial media request and the optimal set of request metadata.

5. The system of claim 1, wherein the optimal set of request metadata includes an optimal placement price determined by combining an initial placement price determined the first machine learning system with a price derivative determined by the retrained second machine learning system.

6. The system of claim 5, wherein the optimal placement price is determined by modifying the initial placement price by a reduction ratio determined by the retrained second machine learning system, the reduction ratio corresponds to an amount of overpayment for a placement.

7. The system of claim 1, wherein the training features of the training sample are determined from a set of media requests for the completed campaigns, the training features encoding at least a portion of request data from the set of media requests and at least a portion of exchange data from one or more online media exchanges receiving at least one media request of the set of media requests, and wherein the training sample includes updated goal probabilities and revised consumer demographic targeting for the in-progress campaign.

8. The system of claim 7, wherein each request in the set of media requests was used to obtain a placement in a second price auction on one or more online media exchanges.

9. A method of optimizing a media request, the method comprising:
encode one or more pieces of request data and one or more pieces of exchange data for a media request included in a completed media campaign in a feature vector, the encoding using an encoder and the feature vector being representative of at least a portion of the request data and a portion of the exchange data of the media request;

generate a feature vector for multiple media requests of the completed media campaign to create a training sample including a set of feature vectors;

training a first machine learning system using the training sample including the set of feature vectors;

determining an initial media request using the first machine learning system;

transmitting a set of multiple media requests generated by the first machine learning system to an online media exchange that manages publishing inventory for one or more online publishing platforms;

receiving one or more pieces of dynamic data related to the transmitted set of initial media requests from a logging engine configured to monitor the online media exchange, the one or more pieces of dynamic data including one or more impression events and one or more exchange outcomes recorded by the online media exchange for an in-progress campaign running on the online media exchange, the in-progress campaign including a portion of the media campaign that has been completed;

updating one or more goal probabilities for the in-progress campaign based on the one or more impression events for the in-progress campaign and one or more pre-defined campaign goals of the media campaign;

encoding one or more pieces of dynamic data received from the logging engine, the one or more updated goal probabilities, and one or more pieces of request metadata for multiple initial media requests of the in-progress campaign in a feature vector for the in-progress campaign, the feature vector for the in-progress campaign including a portion of the dynamic data received for the multiple initial media requests, at least one updated goal probability, and a portion of the request metadata;

training a second machine learning system using a retraining sample;

determining an optimal set of request metadata using the retrained second machine learning system, the optimal set of request metadata modifying one or more pieces of the initial set of request metadata; and transmitting an optimized media request including the optimal set of request metadata to the online media exchange to obtain multiple placements for media content that is are displayed one or more client devices, the optimized media request optimizing the multiple placements obtained from online media exchange for the one or more pre-defined campaign goals.

10. The method of claim 9, wherein the initial media request includes an initial placement price determined by combining an outcome probability score determined by the first machine learning system and a cost per outcome for the media request.

11. The method of claim 9, wherein the first and the second machine learning systems use a neural network to determine at least one of the initial media request and the optimal set of request metadata.

12. The method of claim 9, wherein the first and the second machine learning systems use a logistic regression model to determine at least one of the initial media request and the optimal set of request metadata.

13. The method of claim 9, wherein the optimal set of request metadata includes an optimal placement price determined by combining an initial placement price determined by the first machine learning system with a price derivative determined by the retrained second machine learning system.

14. The method of claim 13, wherein the optimal placement price is determined by modifying the initial placement price by a reduction ratio determined by the retrained second machine learning system, the reduction ratio corresponds to an amount of overpayment for a placement.

15. The method of claim 9, wherein the training features of the training sample are determined from a set of media requests for the completed campaigns, the training features encoding at least a portion of request data from the set of media requests and at least a portion of exchange data from one or more online media exchanges receiving at least one media request of the set of media requests, and wherein the training sample includes updated goal probabilities and revised consumer demographic targeting for the in-progress campaign.

16. The method of claim 15, wherein each request in the set of media requests was used to obtain a placement in a second price auction on one or more online media exchanges.

17. The system of claim 1, wherein the one or more goal probabilities reflect a likelihood the in-progress campaign will achieve the one or more campaign goals during an in-progress campaign.

18. The method of claim 9, wherein the one or more goal probabilities reflect a likelihood the in-progress campaign will achieve the one or more campaign goals during an in-progress campaign.

\* \* \* \* \*